United States Patent [19]
Noda

[11] 3,988,744
[45] Oct. 26, 1976

[54] RECORDING DEVICE

[75] Inventor: Atsushi Noda, Kawasaki, Japan

[73] Assignee: Canon Kabushiki Kaisha, Tokyo, Japan

[22] Filed: July 7, 1975

[21] Appl. No.: 593,515

[30] Foreign Application Priority Data
June 23, 1975    Japan............................. 50-077186
July 9, 1974    Japan...................... 49-080826[U]

[52] U.S. Cl............................. 346/136; 197/133 R; 197/142; 226/199
[51] Int. Cl.²................... G01D 15/24; B41J 15/00; B41J 13/30; B65H 23/00
[58] Field of Search.............. 346/136; 226/74, 199; 197/140, 142, 133 R

[56] References Cited
UNITED STATES PATENTS

| | | | |
|---|---|---|---|
| 3,552,621 | 1/1971 | Kupferschmidt............. | 346/136 UX |
| 3,693,856 | 9/1972 | Funk..................................... | 226/74 |
| 3,799,313 | 3/1974 | Sherick......................... | 346/136 UX |

*Primary Examiner*—George H. Miller, Jr.
*Attorney, Agent, or Firm*—Fitzpatrick, Cella, Harper & Scinto

[57] ABSTRACT

A recording device includes record means for recording information on a recording medium, a guide for feeding the recording medium to the record means, and means for moving the guide in accordance with the configuration of the recording medium.

15 Claims, 7 Drawing Figures

RECORDING DEVICE

BACKGROUND OF THE INVENTION

1. Field of the Invention

This invention relates to a recording device for recording datas such as, for example, inputs, operation results, etc. of an electronic desk-top calculator, and more particularly to a recording device which permits the use of recording mediums having various widths.

2. Description of the Prior Art

The recording devices heretofore provided to electronic desk-top calculators have only permitted the use of recording paper having a particular width and not of recording paper having a width corresponding to the necessary number of record columns.

Therefore, in an electronic desk-top calculator for which programs can be set, if the contents of a program to be recorded are various, such contents must be recorded in a new line for each step and this leaves an unnecessary blank portion in the recording paper with the program recorded thereon, which in turn means wastage of the recording paper.

This is particularly so in the case of a calculator with a recording device using, for example, a thermal head for effecting the recording on a specially treated recording medium, and the wastage of thermosensitive paper results in higher running costs.

SUMMARY OF THE INVENTION

It is an object of the present invention to provide a recording device which can eliminate the above-noted disadvantages.

It is another object of the present invention to provide a recording device which permits interchange between recording mediums of various widths to be achieved by a simple construction.

Other objects of the present invention will become fully apparent from the following detailed description of some embodiments taken in conjunction with the accompanying drawings.

DESCRIPTION OF THE PREFERRED EMBODIMENTS

Figure 1:
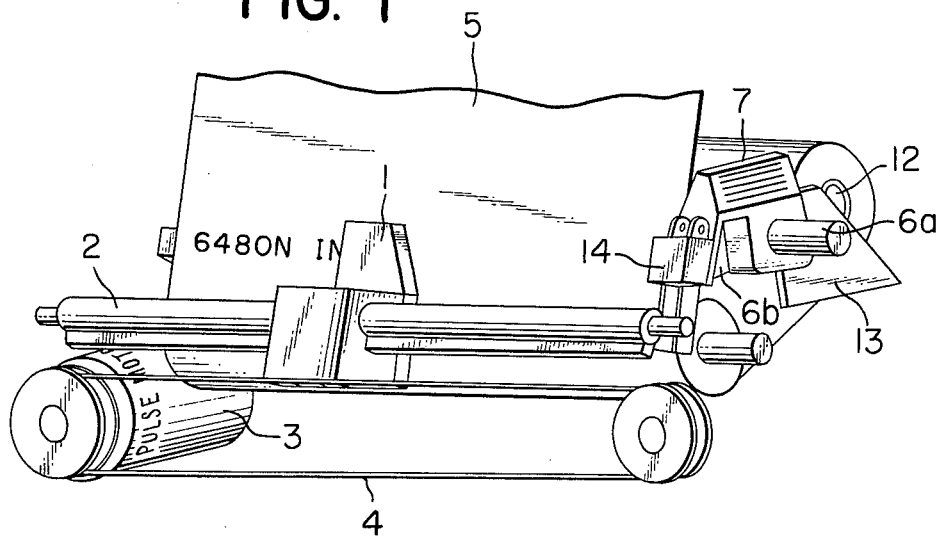
FIG. 1 is a perspective view showing an embodiment of the recording device according to the present invention.

An embodiment of the present invention will hereinafter be described with reference to the accompanying drawings. FIG. 1 is a perspective view of the recording device according to an embodiment of the present invention. Record means, for example, record head 1 such as thermal head, for writing numerical datas including inputs, operation results, etc. and information including operation command from an unshown calculator into a recording medium is slidably mounted on guide rails 2 extending widthwise of a web of recording paper, and may be driven for scanning from right to left of from left to right in FIG. 1 by a pulse motor 3 through a belt 4 which may transmit the drive of the pulse motor. The record head 1 mounted on the guide rails 2 may effect scanning from left to right or vice versa with the aid of the pulse motor 3 to record successive characters corresponding to signals delivered from an electronic desk-top calculator (not shown) onto the web of recording paper 5 loaded in the recording device.

The recording paper 5 on which information is to be written by the record head is loaded in the form of a roll in the recording device with one side edge of the rolled recording paper 5 fixed by a paper guide to be described, and the recording paper 5 may be guided by the paper guide.

Figure 2:
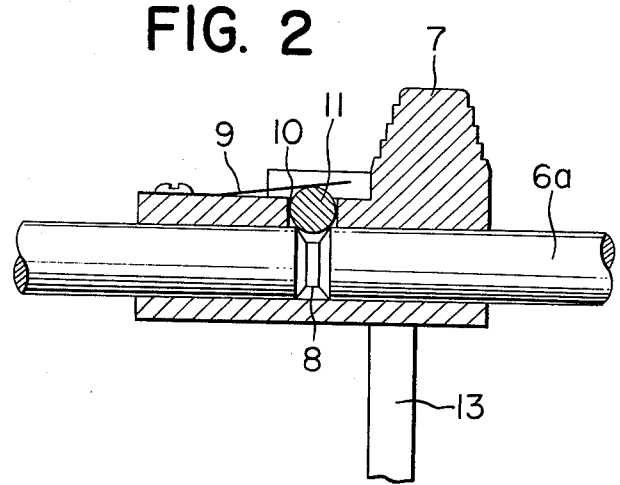
FIG. 2 is a cross-section of the carriage in the embodiment of FIG. 1.

Shafts 6a and 6b extend parallel to the guide rails 2, and a carriage 7 for moving the paper guide is slidably mounted on the shafts 6a and 6b. As shown in FIG. 2 which is a cross-sectional view illustrating the relation between the shaft 6a and the carriage 7, a groove 8 is formed in the shaft 6a at a location corresponding to the width of the recording paper loaded in the recording device, so that when the carriage 7 is slidden along the shaft 6a a roller 11 held in a hole 10 formed in the carriage 7 may be received in the groove 8 by the bias of a leaf spring 9 having one end secured to the carriage 7, thereby restraining the carriage 7 from moving toward the shaft 6a. The downward bias force of the leaf spring 9 against the roller 11 is adjusted such that sliding movement of the carriage 7 is permitted when a force is applied lengthwise of the shaft 6a and that one side edge of the web of recording paper 5 can be held when the roller 11 is engaged in the groove 8.

Figure 3:
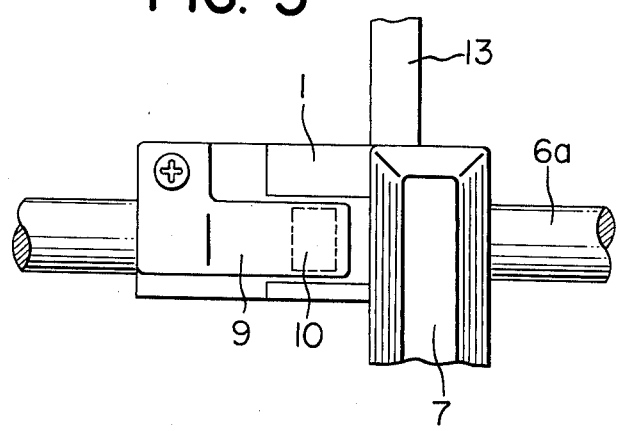
FIG. 3 is a top plan view of the carriage.

If a plurality of webs of recording paper having various widths are to be interchangeably used, the groove 8 may be formed in accordance with the variable width of paper. The carriage 7 holds one side edge of the web of recording paper 5 which is maintained in the form of a roll loaded on the shaft 12, and a paper guide 13 for guiding the recording paper 5 to the record head 1 extends from one end of the carriage 7 perpendicularly to the shaft 6a, as shown in FIG. 3, to restrict the widthwise movement of the loaded recording paper. Also, as shown in FIG. 1, detector means such as, for example, microswitch 14 is provided at the other end of the carriage 7 to prevent the record head 1 from moving or recording beyond the maximum effective width of the recording paper. The detector means detects the movement of the record head 1 to produce and deliver a signal to an unshown control circuit for controlling the record head 1 so as to return to its record start position. Alternatively, such detector means may be a reed switch or a switch using a Hall element.

Figure 4:
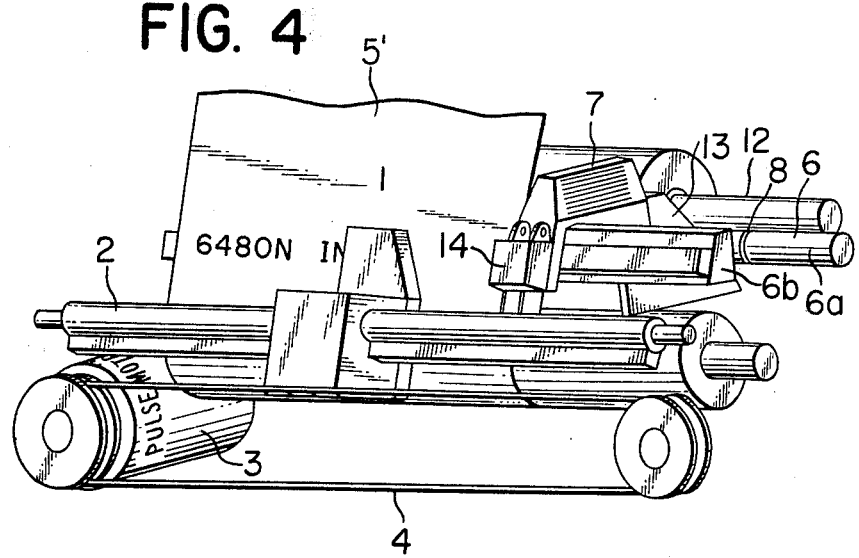
FIG. 4 is a perspective view of the recording device as it is loaded with a web of recording paper having a different width.

Operation of the embodiment so constructed as described will now be described. A web of recording paper 5' narrower in width than the recording paper 5 shown in FIG. 1 is loaded in the manner as shown in FIG. 4, whereafter to move the paper guide 13 toward one side edge of the recording paper 5', the carriage 7 is slidden lengthwise of the shaft 6a as by the operator and moved on the shaft 6a so that the hole 10 formed in the carriage 7 is aligned with the groove 8 preformed to match the width of the recording paper. When the paper guide 13 has come to its predetermined position, the groove 8 and the hole 10 are aligned as shown in FIG. 2, so that the roller 11 is received in the groove 8 by the downward bias force of the leaf spring 9 to thereby prevent the movement of the carriage 7 while, at the same time, the paper guide 13 provided at one end of the carriage 7 is positioned at one side edge of the recording paper. Since the microswitch 14 has also been moved from its original position, the record head 1 starts to scan, for example, from left to right as shown upon application of a signal from the electronic desk-top calculator to the recording device, and when one end of the record head 1 contacts the microswitch 14, the latter is operated to generate a signal from returning the record head 1 to its original position, whereby the control circuit, not shown, is operated to return the record head 1 to its record start position.

The above-described construction permits the use of recording paper having a width corresponding to the width over which information is recorded, and this is particularly useful to save the expensive recording paper such as chemically treated pressure- or temperature- sensitive paper and accordingly reduce the running costs of electronic machinery having a recording device.

Figure 5:
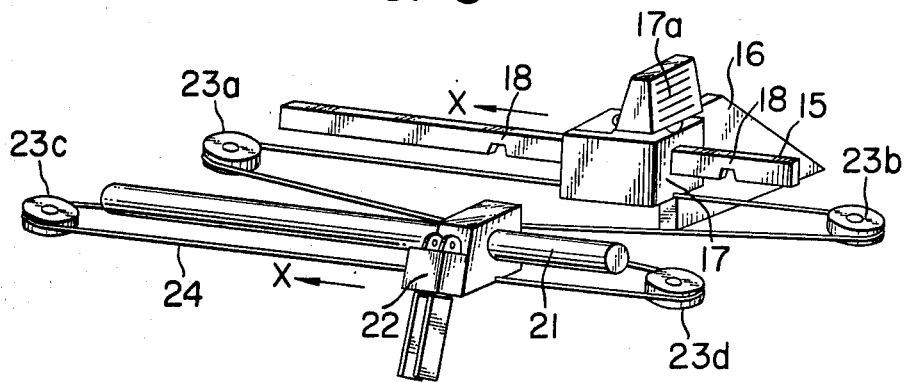
FIG. 5 is a perspective view showing another embodiment of the present invention.

FIG. 5 is a perspective view showing the essential portions of another embodiment of the present invention.

Figure 6A:
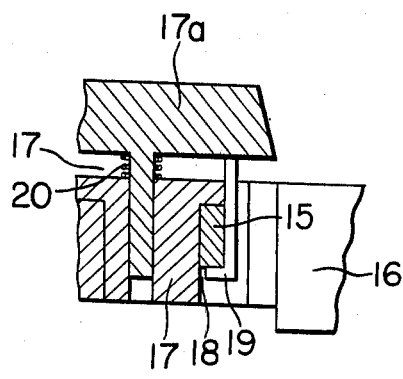
FIGS. 6(a) and (b) are cross-sectional views of the carriage shown in FIG. 5.

A shaft 15 extends parallel to the guide rails slidably mounting thereon the record head driven for scanning from right to left or from left to right by a pulse motor or like drive means as in the previous embodiment. Slidably mounted on the shaft 15 is a carriage 17 for fixing one side edge of the recording paper loaded in the recording device and for moving a paper guide 16 which guides the recording paper to the record head. In order to move and fix the paper guide 16 at the one side edge of the recording paper, an engaging pawl 19 engageable with a cut-away 18 formed in the shaft 15 extends downwardly from the lower portion of the thumb 17a of the carriage 17 and along the shaft 15. As shown in FIG. 6(a), the end portion of the pawl 19 is engaged with the cut-away 18. Such engagement is maintained as by a spring 20 normally biasing the thumb 17a upwardly.

Also, in order that the record head slidably mounted on the guide rails (not shown) extending widthwise of the recording paper and driven for scanning from right to left or from left to right by a pulse motor or like drive means, as in the previous embodiment, may be prevented from recording beyond the maximum effective width of the recording paper, a shaft 21 extends parallel to the guide rails and means like a microswitch 22 for detecting the movement of the record head is slidably mounted on the shaft 21 and coupled to the carriage 17 by wire 24 which passes over pulleys 23a, 23b, 23c and 23d, so that the detector means is movable in the same direction with the carriage 17 as indicated by arrow X in FIG. 5.

Figure 6B:
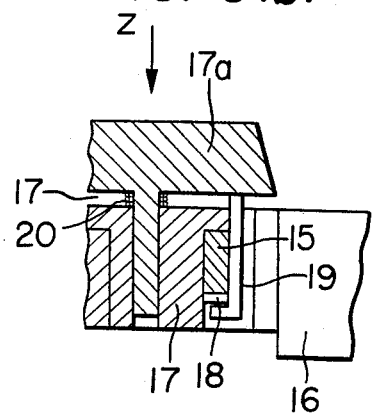

Operation of the present embodiment will now be described. The paper guide 16 movable in accordance with the width of the recording paper loaded in the recording device is operable by the carriage 17 slidable on the shaft 15. If the pawl 19 of the carriage 17 is in engagement with the cut-away 18 to fix the paper guide 16 as shown in FIG. 6(a), such engagement between the pawl 19 and the cut-away 18 will be broken away by an extraneous force being applied in the direction of arrow Z to the thumb 17a raised by the spring 20 as shown in FIG. 6(b) to disengage the end of the pawl 19 from the cut-away 18 and by an extraneous force being applied to the thumb 17a, for example, in the direction of arrow X indicated in FIG. 5. Thereafter, by an extraneous force being applied to the carriage 17, for example, in the direction of arrow X, the carriage 17 is slidden on the shaft 15 to move the paper guide to one side edge of the recording paper, not shown, and bring the pawl 19 into engagement with the cut-away 18 preformed at a predetermined location in the shaft 15. As the result, the paper guide 16 is fixed at the one side edge of the recording paper. With the movement of the carriage 17, the microswitch is moved in the same direction as the carriage by the wire 24, and the contact of the carriage with the microswitch results in generation of a control signal for preventing the record head from recording beyond the effective width of the recording paper.

The above-described construction enables the engagement between the carriage and the shaft to be more secure than that attained by the previous embodiment, and the engagement once provided can resist any possible shock.

I claim:
1. A recording device comprising:
   record means for writing information;
   a guide for feeding a recording medium to said record means;
   means for moving said guide in accordance with the configuration of said recording medium loaded; and
   means movable with the movement of said guide for detecting the range over which said record means writes information on said recording medium.

2. A recording device according to claim 1, wherein said detector means is provided on said moving means.

3. A recording device comprising:
   a recording member movable along guide rail members;
   a guide for holding one side edge of a recording medium to said recording member and for guiding said recording medium to said recording member;
   a member slidably mounted on a shaft disposed parallel to said guide rail members for moving said guide in accordance with the configuration of said recording medium fed to said recording member; and
   a member movable with the movement of said guide caused by said moving member for detecting the range over which said recording member writes information on said recording medium.

4. A recording device according to claim 3, wherein said detector member includes a microswitch.

5. A recording device comprising:
   a recording member movable along guide rail members;
   a guide for holding one side edge of a recording medium to said recording member and for guiding said recording medium to said recording member;
   a member slidably mounted on a shaft disposed parallel to said guide rail members for moving said guide in accordance with the configuration of said recording medium fed to said recording member;
   a member provided on said shaft and engageable with a retractable projected portion, provided on said moving member, to fix said guide in accordance with the configuration of said recording medium; and a member movable with the movement of said guide caused by said moving member for detecting the range over which said recording member writes information on said recording medium.

6. A recording device comprising:
record means for writing information;
a guide for guiding a recording medium to said record means;
means for moving said guide in accordance with the configuration of said recording medium; and
means for detecting the range over which said record means writes information on said recording medium in accordance with the movement of said guide.

7. A recording device according to claim 6, further comprising support means having engaging means for sliding said moving means and for fixing said moving means at a position corresponding to the configuration of said recording medium.

8. A recording device comprising:
record means for writing information;
a guide for guiding a recording medium to said record means;
means for setting said guide in accordance with the configuration of said recording medium; and
means for detecting the range over which said record means writes information on said recording medium in accordance with the set of said guide.

9. A recording device comprising:
recording means;
a guide for guiding a recording medium to said recording means; and
means for detecting a position of said guide which is set in accordance with the configuration of said recording medium, and returning said recording means to an original position thereof.

10. A recording device comprising:
recording means;
a guide for guiding a recording medium to said recording means; and
means for detecting a position of said guide which is set in accordance with the configuration of said recording medium, and returning said recording means to a home position thereof.

11. A recording device according to claim 10, further comprising means for moving said guide in accordance with the configuration of said recording medium.

12. A recording device comprising:
a recording member movable along guide rails;
a guide for holding one side edge of a recording medium to be fed to said recording member and for guiding said recording medium to said recording member;
a member mounted on a shaft disposed parallel to said guide rails for moving said guide in accordance with the configuration of said recording medium fed to said recording member; and
a member provided on said shaft and engageable with a retractable projected portion, provided on said moving member, to fix said guide in accordance with the configuration of said recording medium.

13. A recording device comprising:
recording means for writing information;
a guide for feeding a recording medium to said recording means;
means for moving said guide in accordance with the configuration of said recording medium;
a shaft for supporting said guide moving means, said shaft having a slot corresponding to the configuration of said recording medium; and
a retractable projection provided on said moving means, said projection being engageable with said slot to fix said guide in accordance with the recording medium to be used.

14. A recording device according to claim 13, further comprising a member for applying an external force by manual operation, said force applying member being connectable with said projection.

15. A recording device according to claim 14, further comprising a spring member for applying a force in a direction opposite to that of said external force.

* * * * *